UNITED STATES PATENT OFFICE 2,598,562

N - MERCURI - 1,2,3,6-TETRAHYDRO-3,6-EN-DOMETHANO - 3,4,5,6,7,7 - HEXACHLORO-PHTHALIMIDE

Morton Kleiman, Chicago, Ill., assignor to Velsicol Corporation, Chicago, Ill., a corporation of Illinois No Drawing. Application January 3, 1951, Serial No. 204,270

6 Claims. (Cl. 260—326)

This invention relates to the production of a new group of compositions of matter. More specifically, this invention relates to a class of compositions conforming with the following structural formula:

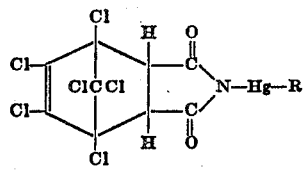

wherein R is an alkyl, cycloalkyl, alkenyl, aryl, or aralkyl radical containing up to 22 carbon atoms. To exemplify the nomenclature of this group of compositions, where R is an ethyl group, the compound is termed N-ethylmercuri-1,2,3,6-tetrahydro-3,6 - endomethano - 3,4,5,6,7,7-hexachlorophthalimide. If R represents any other group, the name will conform with that given above, except that the name of the group will be substituted for the "ethyl."

More specifically, where R is allyl, the compound is termed N-allylmercuri-1,2,3,6-tetrahydro - 3,6 - endomethano - 3,4,5,6,7,7 - hexachlorophthalimide; where R is phenyl, the compound is N-phenylmercuri-1,2,3,6-tetrahydro-3,6-endomethano - 3,4,5,6,7,7 - hexachlorophthalimide; where R is beta-chloroethyl the compound is N-beta-chloroethylmercuri-1,2,3,6-tetrahydro - 3,6-endomethano - 3,4,5,6,7,7 - hexachlorophthalimide; where R is phenethyl the compound is N-phenethylmercuri - 1,2,3,6 - tetrahydro-3,6 - endomethano - 3,4,5,6,7,7 - hexachlorophthalimide. In a like manner, the nomenclature of any compound in the group is established as above stated.

Broadly, the products of this invention are prepared by reacting hexachlorocyclopentadiene in a Diels-Alder manner with maleic anhydride; the adduct thus formed is reacted with ammonia or an ammonia producing compound to form the imide of the aforesaid phthalic acid derivative; an N-metallo derivative of this imide is then prepared and reacted with RHgX, wherein R is a radical as previously defined, and X is a halogen such as chlorine, bromine, and iodine, to result in the desired product and a metal halide salt.

For clarity, the reactions involved are presented below:

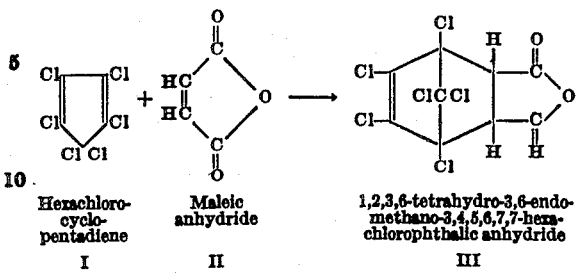

Hexachloro-cyclo-pentadiene　　Maleic anhydride　　1,2,3,6-tetrahydro-3,6-endo-methano-3,4,5,6,7,7-hexa-chlorophthalic anhydride
I　　　　　　　　II　　　　　　　　III

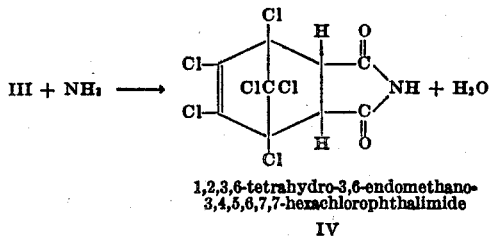

1,2,3,6-tetrahydro-3,6-endomethano-
3,4,5,6,7,7-hexachlorophthalimide
IV

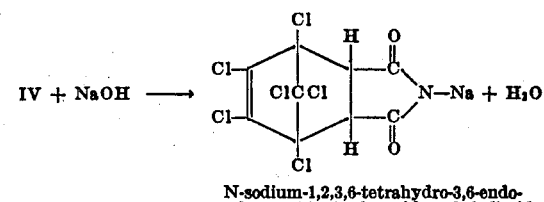

N-sodium-1,2,3,6-tetrahydro-3,6-endo-
methano-3,4,5,6,7,7-hexachlorophthalimide
V V + C₂H₅HgCl ⟶

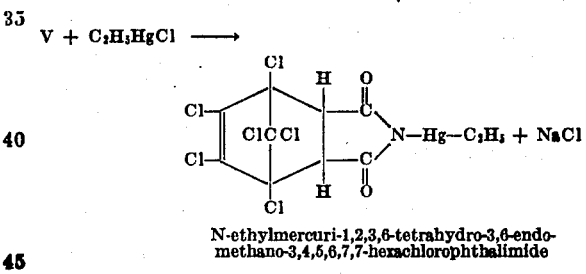

N-ethylmercuri-1,2,3,6-tetrahydro-3,6-endo-
methano-3,4,5,6,7,7-hexachlorophthalimide As an alternative to the method of preparation above described, hexachlorocyclopentadiene may be reacted in a Diels-Alder manner with maleic acid, and the resulting adduct can then be treated as described for the adduct of hexachlorocyclopentadiene and maleic anhydride.

According to the preferred method, hexachlorocyclopentadiene and maleic anhydride are reacted together at temperatures between about 110 and 220° C. for from about ten minutes to about ten hours, depending upon the temperature employed. A preferred temperature range wherein the reaction proceeds relatively rapidly and satisfactorily is about 140–180° C. Reaction periods longer than ten hours are not harmful; however, it is preferred that the reaction period be so limited as to minimize decomposition and side reactions. The reaction is preferably carried out in the absence of solvent; however, solvents may be used if desired. Xylene, methylated naphthalenes, and toluene are among the preferred solvents. Paraffinic solvents may also be used. Since the reaction is one of addition, equal molar quantities of reactants are preferred. An excess of either reactant will not prevent reaction, but is only uneconomical. If a solvent is used, it can be removed from the product by distillation, or else the product may be crystallized by cooling, and removed by filtration. The product can then be purified, if desired, prior to subjecting it to the next step in the process. This can be accomplished by recrystallization from a hydrocarbon solvent such as xylene and heptane or the like.

In accordance with the non-fully-equivalent alternative wherein maleic acid is used as a starting material instead of maleic anhydride, maleic acid is adducted with hexachlorocyclopentadiene in the same manner as is maleic anhydride. The product is then treated in the same manner as hereinafter described for the adduct of hexachlorocyclopentadiene and maleic anhydride.

The imide derivative of the Diels-Alder adduct of hexachlorocyclopentadiene and maleic anhydried (compound IV) is prepared by reacting the latter with ammonia or with an ammonia producing compound, e. g., an ammonium salt, as ammonium carbonate. Thus, the heating of aqueous ammonia and the adduct-anhydride will result in a material which, after evaporation to dryness and heating at temperatures of about 150–250° C. will produce the desired imide. Similarly, the fusion of the adduct-anhydride with ammonium carbonate results in excellent yields of the desired imide.

The alkyl, cycloalkyl, alkenyl, aryl, or aralkyl mercuri-halide can be prepared by means known to the art, such as by reacting the appropriate Grignard reagent with mercuric bromide. An alternative known method is based on the reactions: $R_4Pb+2HgX_2 \rightarrow 2RHgX+R_2PbX_2$; wherein R is a group as defined and X is iodine, bromine or chlorine. The reaction may also proceed as $R_4Pb+4HgX_2 \rightarrow 4RHgX+PbX_4$. The metal salt of the aforementioned imide is prepared by dissolving the imide in a solvent such as methanol, containing a metal hydroxide. Mixed solvents such as methanol and dioxane may be used if desired. To the solution of the imide salt formed by the action of the metal hydroxide is then added the alkyl, cycloalkyl, alkenyl, aryl, or aralkyl mercuric-halide, whereupon metal halide precipitates. This metathesis is hastened by heating the solution; however, the temperature at which this reaction is carried out is not critical. The precipitate of metal halide is filtered off, and the final, desired product obtained by further concentration and cooling of the reaction mixture. Purification of the product may be effected, if desired, by recrystallization from a hydrocarbon solvent such as heptane, although this is generally not necessary since the technical grade product produced as above is usually of a high degree of purity.

To illustrate the process resulting in the product of the present invention more clearly, a detailed description of one method thereof is herewith presented.

EXAMPLE

A. *Preparation of the Diels-Alder adduct of Hexachlorocyclopentadiene and maleic anhydride*

A solution of 6 moles hexachlorocyclopentadiene, 6 moles maleic anhydride and 75 ml. xylene was placed in a 3-neck, 3-liter flask equipped with a mechanical stirrer and thermometer. The stirrer was started and the mixture was slowly heated until a temperature of 145° C. was attained. Heating was discontinued and the temperature continued to rise spontaneously to 170° C. After the reaction rate had begun to subside, heat was reapplied to maintain the temperature at 160–170° C. for one additional hour. Heating was then discontinued, and when the temperature had dropped to about 140° C., 75 ml. additional xylene was added; then when the temperature had dropped to about 120° C., one liter of heptane was slowly added with stirring. The reaction mixture was transferred to a 3-liter beaker, stirred well, and allowed to cool to room temperature. The crystalline product was removed by filtration, washed with hexane, and dried under vacuum. The yield of product having a melting point of 235–237° C. was 1981 grams (89.0% of the theoretical).

B. *Preparation of the imide derivative of the Diels-Alder adduct of hexachlorocyclopentadiene and maleic anhydride*

Hexachlorocyclopentadiene - maleic anhydride adduct (0.1 mole—37.1 grams) was mixed with ammonium carbonate monohydrate (0.1 mole—11.4 grams) in a covered beaker and heated to fusion with stirring. The fused mixture was cooled and dissolved in 400 ml. of boiling xylene. Carbonaceous matter was filtered off and the solution was concentrated to 200 ml. Crystallization resulted readily on cooling. The product was filtered and dried at 110° C. It had a melting point of 274–7° C. and weighed 25.5 grams. The filtrate was further concentrated to result in additional material, the yield totaling about 80% of the theory.

C. *Preparation of ethyl mercuric bromide*

The preparation of alkyl, cycloalkyl, alkenyl, aryl, and aralkyl mercuric halides is well known in the art. For convenience, a specific preparation of ethyl mercuric bromide is herewith presented.

Magnesium (1 mole; 24.3 grams) was introduced into a 1-liter, 3-necked flask equipped with a dropping funnel, stirrer and reflux condenser. Precautions were taken to keep the apparatus and reagents free of moisture. Ethyl bromide (1.05 mole; 114.4 grams) was dissolved in 400 ml. anhydrous ether and placed in the dropping funnel. About 50 ml. of this solution was introduced into the reaction vessel quite rapidly, whereas the remaining solution was introduced over a period of about 45 minutes. The resultant mixture was refluxed for an additional half hour.

The Grignard reagent thus prepared was introduced very slowly into a stirred suspension of mercuric bromide (425 grams) in 200 ml. anhydrous ether. The reaction was highly exothermic, and it was therefore cooled. Stirring was continued as long as heat was evolved by the reaction. The reaction was evaporated to dryness and the residue crystallized twice from 60–65% aqueous ethanol. The thus purified product had a melting point of 190–193° C.

D. *Preparation of the alkali metal salt of 1,2,3,6-tetrahydro -3,6- endomethano-3,4,5,6,7,7- hexachlorophthalimide*

Potassium hydroxide (0.1+ mole; 5.8 grams) was dissolved in absolute methanol (75 ml.) at room temperature, and the resulting solution was added to a boiling solution of 1,2,3,6-tetrahydro-3,6-endomethano -3,4,5,6,7,7 - hexachlorophthal - imide (0.1 mole; 37.1 grams) in anhydrous dioxane (75 ml.). The resulting solution, which contained the desired potassium salt of the imide was cooled to room temperature.

E. *Preparation of N-ethylmercuri-1,2,3,6-tetrahydro-3,6-endomethano-3,4,5,6,7,7-hexachlorophthalimide*

Ethyl mercuric bromide (0.1 mole; 31.0 grams) was dissolved in a mixture of anhydrous dioxane (200 ml.) and absolute methanol (67 ml.) by heating. This solution, while hot, was added to the solution as described in part D above. This mixture was kept warm for about 2½ hours and then cooled to room temperature. Precipitated potassium bromide was removed by filtration and the filtrate concentrated to 100 ml. by evaporation. Pentane (200 ml.) was then added to the filtrate and the mixture was stirred. The precipitate which formed was collected by filtration and dissolved in boiling heptane (650 ml.). Undissolved potassium bromide was removed by filtration and the filtrate was concentrated to a volume of 400 ml. by evaporation and then cooled to $-8°$ C. The desired product precipitated and was isolated from the liquid by filtration. This product was recrystallized from a 4:1 mixture of heptane and benzene to result in a pure product having a melting point of 140–141° C.

Calculated for $C_{11}H_7Cl_6O_2N-Hg$: per cent $C=22.07$; per cent $H=1.18$; per cent $Cl=35.54$. Found by analysis: per cent $C=22.35$; per cent $H=1.32$; per cent $Cl=35.62$.

It should be noted that other alkyl, cycloalkyl, alkenyl, aryl, or aralkyl substituents may be substituted for the ethyl group of the specific example merely by starting with the desired alkyl, cycloalkyl, alkenyl, aryl, or aralkyl halide and preparing the corresponding mercury halide derivative thereof and reacting it as described for ethylmercuri bromide. Substituents which can be substituted for the ethyl group of the product of the specific example are, for example, alkyl groups such as methyl, beta-chloroethyl, propyl, beta-hydroxyethyl, hexyl, dodecyl; alkenyl groups such as allyl, methallyl, propenyl, beta-chloroallyl; cycloalkyl groups such as cyclohexyl, aminocyclohexyl, cyclopentyl; aryl groups such as phenyl, p-bromophenyl, 4'-methoxybiphenyl, biphenyl, naphthyl; aralkyl groups such as benzyl, p-aminobenzyl, phenethyl, phenylpropyl, phenylbutyl, p-fluorobenzyl, etc. Generally any alkyl, cycloalkyl, alkenyl, aryl, or aralkyl group containing up to 22 carbons can be substituted. While only the bromide has been specifically mentioned, chlorides and iodides will react substantially equivalently.

Although the potassium salt of the imide is shown in the specific examples, other alkali metal salts are equally suitable, as are even the salts of other non-preferred metals such as those of the alkaline earth group.

The products of the present invention exhibit unusually superior fungicidal properties. For example, N - ethylmercuri-1,2,3,6-tetrahydro-3,6-endomethano -3,4,5,6,7,7- hexachlorophthalimide was tested against the spores *Colletotrichum phomoides* and *Monolinia fructicola* according to the test tube dilution spore germination method (hereinafter described) and showed an unexpectedly low effective dose rating indicating unexpectedly high fungicidal activity. These results are tabulated subsequent to the description of the test method previously identified.

The N-ethylmercuri compound (0.1 gram) was stirred into 1 ml. of acetone, and 9 ml. of distilled water were added. This stock solution was diluted down to various concentrations equal to twice the concentrations indicated in Table I. To each diluted sample was added an equal volume of 0.2% orange juice containing 100,000 spores per milliliter. Thus the final stock dilutions contained concentrations of N-ethylmercuri compound in the amounts listed in Table I, as well as 0.1 per cent orange juice and 50,000 spores per milliliter.

Four drops of each compound-spore suspension were placed on chemically clean glass slides in moist chambers and kept at 20° C. for 24 hours. The percentage of spore germination was observed as is recorded in the following Table I. Also shown are the results obtained on blanks containing orange juice and acetone, respectively.

TABLE I

*Inhibition of spore germination of* Colletotrichum phomoides *on glass slides*

| Concentration of N-ethylmercuri imide in parts per million | Percentage inhibition |
|---|---|
| 125 | 100 |
| 63 | 100 |
| 31 | 100 |
| 16 | 100 |
| 8 | 100 |
| 4 | 100 |
| 2 | 100 |
| 1 | 100 |
| 0.5 | 100 |

| Controls | Percentage germination |
|---|---|
| Spores in 0.1 per cent orange juice | 96 |
| Spores in 0.125 per cent acetone solution | 98 |

From the above data it is evident that the test compound has an ED50 (effective dosage to inhibit 50 per cent of the spores) of considerably less than 0.5 part per million.

The test against the *Monolinia fructicola* spores was run in the same fashion as was above described except that the original stock solution from which the concentrations shown in Table II were derived was prepared as follows:

The compound (0.1 gram) was stirred into 100 ml. of acetone, and 900 ml. of water was added. This stock solution was then diluted to give the varying concentrations shown after adding in each case an equal volume of 0.2% orange juice containing 100,000 spores per milliliter.

TABLE II

*Inhibition of spore germination of Monolinia fructicola on glass slides*

| Concentration of N-ethylmercuri imide in parts per million | Percentage inhibition |
|---|---|
| 0.5 | 100 |
| 0.250 | 48 |
| 0.125 | 30 |
| 0.0625 | 9 |
| 0.03125 | 6 |

| Controls | Percentage germination |
|---|---|
| Spores in 0.1 per cent orange juice | 95 |
| Spores in 0.05 per cent acetone solution | 94 |

The ED50 is thus 0.260 part per million.

It is evident that the compounds of the present invention are unusualy and unexpectedly potent fungicides. They may be utilized and applied as a sole active ingredient dispersed in carriers such as dusts, solvents, aqueous dispersions or other carriers frequently used in the art. In addition, the compounds of the present invention can be used in combination with other insecticides or fungicides.

I claim as my invention:

1. As a new composition of matter, a compound having the formula

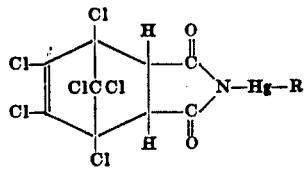

wherein R is an organic radical containing less than 22 carbon atoms, of the group consisting of alkyl, lower alkenyl, carbocyclic aryl containing from one to two rings, cycloalkyl wherein the ring contains from five to six carbon atoms, and aralkyl wherein the aryl portion is carbocyclic and mono-nuclear.

2. As a new composition of matter, a compound having the formula

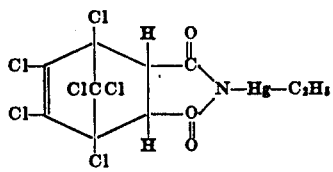

3. As a new composition of matter, a compound having the formula

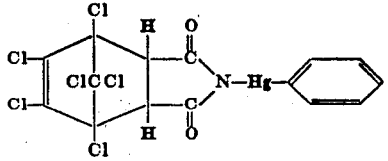

4. As a new composition of matter, a compound having the formula

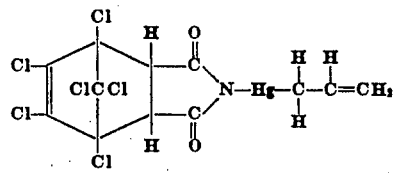

5. As a new composition of matter, a compound having the formula

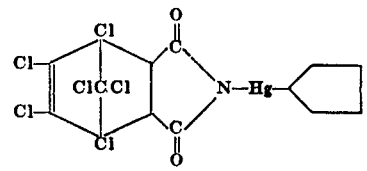

6. As a new composition of matter, a compound having the formula

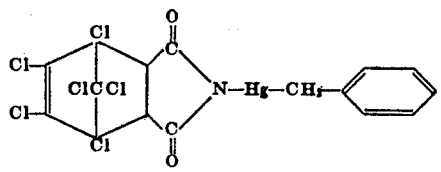

MORTON KLEIMAN.

REFERENCES CITED

The following references are of record in the file of this patent:

UNITED STATES PATENTS

| Number | Name | Date |
|---|---|---|
| 2,273,443 | Klos | Feb. 17, 1942 |
| 2,524,145 | Tawney | Oct. 3, 1950 |